US005630990A

United States Patent [19]
Conrad et al.

[11] Patent Number: 5,630,990
[45] Date of Patent: May 20, 1997

[54] OZONE GENERATOR WITH RELEASABLE CONNECTOR AND GROUNDED CURRENT COLLECTOR

[75] Inventors: Wayne E. Conrad, Hampton; Richard S. Phillips, Courtice; Andrew R. H. Phillips, Oshawa; Raymond E. Bowman, Bowmanville; Helmut G. Conrad, Oshawa, all of Canada

[73] Assignee: T I Properties, Inc., Los Angeles, Calif.

[21] Appl. No.: 336,237

[22] Filed: Nov. 7, 1994

[51] Int. Cl.$^6$ .................................................. B01J 19/12
[52] U.S. Cl. .................... 422/186.07; 422/906; 422/907
[58] Field of Search ........................... 422/186.07, 906, 422/907

[56] References Cited

U.S. PATENT DOCUMENTS

| | | | |
|---|---|---|---|
| 1,326,631 | 12/1919 | Bayeux et al. | 422/186.07 |
| 2,884,511 | 4/1959 | Berghavs et al. | 219/121 |
| 3,024,185 | 3/1962 | Fleck | 204/318 |
| 3,214,364 | 10/1965 | Tuyle | 204/321 |
| 3,364,129 | 1/1968 | Cremer | 204/321 |
| 3,365,383 | 1/1968 | Blair | 204/321 |
| 3,942,020 | 3/1976 | Ciambrone | 250/539 |
| 3,967,131 | 6/1976 | Slipiec | 250/539 |
| 4,069,665 | 1/1978 | Bolasny | 60/275 |
| 4,153,560 | 5/1979 | Dinter | 250/531 |
| 4,410,495 | 10/1983 | Bassler | 422/186.18 |
| 4,417,966 | 11/1983 | Krauss | 204/176 |
| 4,656,010 | 4/1987 | Leitzke et al. | 422/186.18 |
| 4,790,980 | 12/1988 | Erni et al. | 422/186.15 |
| 4,816,229 | 3/1989 | Jensen et al. | 422/186.2 |
| 4,859,429 | 8/1989 | Nisenson | 422/186.13 |
| 4,877,588 | 10/1989 | Ditzler et al. | 422/186.19 |
| 4,910,637 | 3/1990 | Hanna | 361/229 |
| 5,009,858 | 4/1991 | Mechtersheimer | 422/186.19 |
| 5,034,198 | 7/1991 | Kaiga | 422/186.07 |
| 5,089,098 | 2/1992 | Tacchi | 204/176 |
| 5,091,069 | 2/1992 | Hendrickson | 204/176 |
| 5,094,822 | 3/1992 | Dunder | 422/186.22 |
| 5,130,003 | 7/1992 | Conrad | 204/176 |
| 5,135,725 | 8/1992 | Hendrickson | 422/186.15 |
| 5,145,350 | 9/1992 | Dawson et al. | 422/186.15 |
| 5,169,606 | 12/1992 | Batchelor | 422/186.19 |
| 5,269,893 | 12/1993 | Conrad | 204/176 |
| 5,285,372 | 2/1994 | Huynh | 363/132 |
| 5,348,709 | 9/1994 | Wheatley | 422/186.18 |
| 5,364,600 | 11/1994 | Stiehl et al. | 422/186.07 |
| 5,437,843 | 8/1995 | Kuan | 422/186.07 |

*Primary Examiner*—Charles T. Jordan
*Assistant Examiner*—Daniel Jenkins
*Attorney, Agent, or Firm*—Hale and Dorr

[57] ABSTRACT

A generator is taught which uses alternating current or pulsating direct current to produce ozone from oxygen. The generator comprises a high voltage and ground electrode separated to form a gap for accommodating a dielectric member and gas to be reacted. The generator includes many features which may be used alone or in combination to provide an energy efficient and safe apparatus.

34 Claims, 8 Drawing Sheets

OZONE GENERATOR WITH RELEASABLE CONNECTOR AND GROUNDED CURRENT COLLECTOR

FIELD OF THE INVENTION

This invention is directed to an apparatus for producing ozone and, in particular, an apparatus for producing ozone using alternating current or pulsating direct current.

BACKGROUND OF THE INVENTION

Ozone generators are known which employ corona discharge to produce ozone from oxygen by action of oxygen atoms on oxygen molecules. These generators employ a high voltage alternating sinusoidal current operating at frequencies of between about 60 and 5,000 Hz and voltages frequently above 20 kilovolts. Such generators require high voltage transformers which are difficult to construct and insulate and which cause the generator to be very large in size.

During breakdown, oxygen or air in the gap becomes partially ionized as several kilovolts of energy is applied to it, and milliampere to ampere currents result. Bemuse of the required operating frequencies and voltages of most known generators and the fragile nature of the dielectrics of the reaction chamber, deterioration of the generators often occurs, requiring maintenance and repair. The construction of known generators requires that the entire unit including generator, transformer and any associated electronics be shipped offsite for repair and maintenance.

To allow a better understanding of the prior art, reference may be made to the following drawings of prior art in which FIGS. 1 and 2, each show a prior art ozone generator.

Referring to FIG. 1, a plate generator 10 is shown having a pair of metallic plate electrodes 12, 14 and a layer of dielectric material 20 therebetween. Electrodes 12, 14 are separated to form a gap 18.

The ozone generator of FIG. 2 employs a tubular geometry and includes a first electrode 25 and a second, larger diameter, electrode 26. Electrode 25 has a layer of dielectric material 27 disposed on the surface thereof and is positioned within electrode 26 to form a gap 28 therebetween.

In known generators, such as those shown in FIGS. 1 and 2, a high voltage current is applied to the electrodes to produce a corona discharge in the gap. The discharge produces ozone by ionization of oxygen which is present in the gap.

SUMMARY OF THE INVENTION

According to a broad aspect of the present invention there is provided an apparatus for producing ozone from oxygen comprising a generator element having a high voltage electrode and a ground electrode separated from the high voltage electrode to form a gap and a dielectric element disposed therebetween and occupying a portion of the gap, the generator element being electrically connected to a circuit for producing an alternating current or pulsed direct current and the generator element being removable from the circuit.

According to a further broad aspect of the present invention there is provided an apparatus for producing ozone from oxygen comprising a generator element having a high voltage electrode and a ground electrode separated from the high voltage electrode to form a gap and a dielectric element disposed therebetween and occupying a portion of the gap, the high voltage electrode being electrically connected to a circuit for producing alternating or pulsating direct current, the high voltage and ground electrodes being impedance matched to the circuit.

According to a further broad aspect of the present invention there is provided an apparatus for producing ozone from oxygen comprising a generator element having a high voltage electrode and a ground electrode separated from the high voltage electrode to form a gap and a dielectric element disposed therebetween and occupying a portion of the gap, the high voltage electrode being electrically connected to a circuit for producing alternating or pulsating direct current, and a grounded current collector at an output of the generator element.

According to a further broad aspect of the present invention there is provided an apparatus for producing ozone frown oxygen comprising a generator element having a high voltage, electrode and a ground electrode separated from the high voltage electrode to form a gap and a dielectric element disposed therebetween and occupying a portion of the gap, the high voltage electrode being electrically connected to a circuit for producing alternating or pulsating direct current, the chamber being provided such that its inductance and capacitance are selected to produce a waveform within the gap having a high frequency component which is selected break the oxygen—oxygen bond.

According to a further broad aspect of the present invention there is provided an apparatus for producing ozone from oxygen comprising a generator element having a high voltage electrode and a ground electrode separated from the high voltage electrode to form a gap and a dielectric element disposed therebetween and occupying a portion of the gap, the high voltage electrode being electrically connected to a circuit for producing alternating or pulsating direct current, the circuit having a saturable transformer with at least one feedback winding.

DESCRIPTION OF THE INVENTION

A generator is provided which employs alternating current or pulsating direct current to produce ozone from oxygen gas or oxygen-containing gas. The generator comprises a generator element comprising a ground electrode and a high voltage electrode spaced from the ground electrode and having a discharge gap therebetween to accommodate the gas and a dielectric member. In a preferred embodiment, the generator element is of a tubular arrangement wherein the high voltage electrode is disposed within the ground electrode and the dielectric layer is disposed therebetween. The generator element is formed to contain a gas and permit flow of the gas, where desired, through the discharge gap.

The ground electrode is formed of suitable conductive metal or semiconductive material. Where the gas flow is passed in contact with the electrode, the ground electrode is made from a material, such as for example, stainless steel, which is ozone inert. In an embodiment of a tubular generator arrangement, the ground electrode is formed as a tube into which the dielectric and high voltage electrode fit. In another embodiment, the ground electrode is formed as a block and provides support for the dielectric. The block electrode is formed with a channel therethrough or in sections having alignable grooves for accommodating the dielectric.

The high voltage electrode is formed of materials similar to those of the ground electrode and is evenly spaced from the ground electrode to provide an even capacitive load. In a generator element having a tubular geometry the high voltage electrode is formed to fit within the ground electrode and a discharge gap is formed therebetween. To provide an even capacitive load in the generator, the high voltage electrode is maintained substantially centrally within the ground electrode by any suitable means. In an embodiment, the high voltage electrode is a wire held centrally by means of centralizer spirals formed of an inert polymer. Alternatively, dielectric centering blocks, such as ceramic triangles or apertured discs, can be employed. In an alternate embodiment, a spiral electrode is provided and is maintained centrally by means of centering blocks disposed at each end of the channel in which the electrode is mounted. In such an embodiment, a dielectric member can be used as a support for the spiral electrode by winding the electrode about the member or by inserting the member into a prepared spiral electrode. The member is solid and acts to prevent the flow of gas along the center axis of the chamber and thereby directs the gas through electrical discharge between the high voltage and the ground electrodes. In another embodiment the centering blocks are formed integral with the dielectric support member and the spiral electrode is wound thereabout.

The dielectric member which is positioned between the ground electrode and the high voltage electrode acts as a capacitor together with the gas which is supplied to the generator. In one embodiment, the dielectric is positioned in close contact with the ground electrode. Alternatively, the dielectric material is disposed about the high voltage electrode. The dielectric member is formed of a suitable dielectric material such as a ceramic, glass or polymeric material and is preferably separate or easily separable from the electrodes to allow for independent replacement of the dielectric member apart from the electrodes and to facilitate recycling of generator components. In a preferred embodiment, the dielectric member is formed of mullite ceramic.

The generator is formed to contain gas in any suitable way. In embodiments with a tubular geometry, the gas passes between the tubular electrodes and is contained therebetween by a pair of end caps. The end caps provide ports for electrical contact and input and output of gas. In an embodiment, the end caps are formed as end blocks for supporting the generator element and containing means for electrical connection and flow paths for the gas. The end blocks can be formed to prevent direct access to the inner components. The end blocks are formed of an ozone inert dielectric.

Contact must be provided between the electrodes and the generator circuit for producing the current for ozone generation. Preferably, such contact is releasable such that when desired, the generator element of the present invention can be removed from the generator for maintenance and repair. In an embodiment, a high voltage plug connection is employed. A plug is mounted on the generator element and in communication with the high voltage electrode which is disposed to make contact with a socket provided in communication with the external circuit. In a preferred embodiment, the high voltage electrode is connected to the circuitry by means of a high voltage pin. The pin has a first end which extends from the generator to form a plug and a second end for contacting the high voltage electrode. Such contact can be a pressure contact made in the aperture of a centering block into which the second end of the pin and an end of the high voltage electrode are each inserted. Such a contact arrangement avoids the need for soldering.

The electrode geometry in the generator cad be selected to create impedance in the generator circuit which matches the impedance of the circuitry. In a plate generator arrangement, the distance between the electrodes, the surface area of the electrodes and the density of the electrodes, such as for example, the use of mesh electrodes or solid electrodes, can be selected to allow for impedance matching. Impedance matching in a tubular generator can be accomplished by selecting the pitch and length of a spiral high voltage electrode or by winding a selected number of turns of a conductive wire in contact with the high voltage or ground electrodes. Such impedance matching enhances the energy efficiency of the generator.

To dissipate the heat produced in the generator, it is desirable to provide a heat sink arrangement in association with the generator element. The heat sink can preferably also be an electrical ground for the generator and, as such, is provided in intimate contact with the ground electrode but is detachable therefrom, when desired.

To prevent a shock hazard by use of the inventive generator, should water enter the generator and make contact with the high voltage electrode, a grounded current collector can be provided at the gas outlet to ground the current. In an embodiment, the current collector is formed as a electrically conductive conduit for carrying output gas and is grounded by contact with the ground electrode of the generator. In another embodiment, the current collector is a conduit formed integral with the ground electrode and in engagement with the end blocks.

All components of the generator which are in contact with the gas must be built having regard to the corrosion problems of the gas to be introduced and the ozone formed in the generator, as is known in the art.

The generator is of use with pulsating direct current or alternating current. In a preferred embodiment, oxygen—oxygen bonds are selectively broken by use of a high frequency, high voltage alternating current or pulsed direct current discharge which is selected to have a waveform having a fast rise leading edge suitable for breaking the oxygen—oxygen bond. The fast rise portion of the waveform creates a range of high frequency components defined by the rate of change at each point on the slope in conjunction with the repetition rate and the amplitude of the waveform. The time that the leading edge of a waveform is maintained at any given frequency combined with the voltage at that point give a potential energy transfer rate.

To break the oxygen—oxygen bonds the leading edge of the waveform is selected to have a high frequency component which breaks the oxygen molecules apart, termed the "active frequency" or "active high frequency component". This active frequency must be applied at a suitable voltage and be maintained for a sufficient time to transfer enough energy to the molecule to break the bond.

It is believed that the active high frequency component is close to a primary or harmonic of the natural oscillating frequency of the oxygen—oxygen bond and therefore creates constructive interference with the oscillation of any oxygen—oxygen bonds which are in phase with the applied active frequency. It is believed that suitable active frequencies are at least in the megahertz range. This active frequency is applied at a suitable voltage and is maintained for a sufficient time to transfer enough energy to the molecule to break the bond. It is believed that the suitable voltage is at least 3 times the combined strength of the bonds to be broken. It is further believed that an avalanche effect is created wherein further oxygen—oxygen bonds are broken by those broken through the application of the active frequency. In such an effect, the release of bond energy causes the separated oxygen atoms to be high in energy and to collide with other oxygen molecules that are weakened from the application of the current. Due to the collision, the oxygen—oxygen bonds of the weakened molecules are broken. Since it is believed that the applied active frequency can be a harmonic of the natural oscillating frequency, it is also believed that there are many active frequencies that are suitable for interference with the oxygen—oxygen bond, as there are many harmonics of that bond.

In an ozone generator employing a current having an active high frequency component, it is believed that substantially only oxygen—oxygen bonds are broken, even where other molecular species are present. However, due to ionization in the chamber and the impact of high energy oxygen atoms, some side reactions may occur such as the production of nitrous oxides.

In an embodiment, a periodic wave form is generated having a leading edge selected to represent an active frequency for breaking oxygen—oxygen bonds and sufficient voltage to break the bond once it is applied. In a continuous system, wherein oxygen molecules are being converted to ozone and passed on, the flow rate of the molecules through the chamber must be considered and the voltage should be increased accordingly, to expose each portion of the gas containing the oxygen molecules to sufficient voltage to initiate bond breakage before the gas passes out of the generator.

In order to carry out the process of the present invention, the generator circuitry is set to apply an alternating or pulsed direct current having a fast rise and sufficient voltage. To obtain an active high frequency component and optimize the waveform for ozone production, the repetition rate of the waveform or amplitude of the current, or inductance or capacitance of the circuit transformer or generator can be adjusted while analyzing ozone production by use of a chemical analyzer, such as a mass spectrometer or ozone monitor. In a preferred embodiment, the inductance and capacitance are maintained constant, while the repetition rate and amplitude are adjusted to obtain an active high frequency component. Once the generator is set, the ozone production can continue without modification at substantially similar operating pressure and temperature. Any changes in the voltage or the repetition rate of the applied discharge or changes in the inductance or capacitance of the circuit generator or transformer, including changes in pressure or generator load, require reoptimization of the waveform to re-establish the active high frequency component. Such readjustment can be made manually or by use of a circuit feedback arrangement. In addition, in generators produced with similar geometry, fie circuit can be optimized once and incorporated into each further generator without resetting.

In one embodiment a capacitive-inductive resonating circuit is used to produce a carrier waveform having the required active frequency for the ozone production. The circuit is powered by any suitable power supply or source. The resultant waveform can be an alternating current or a pulsed direct current having a fast rise leading edge. In a preferred embodiment, the current is an pulsating direct current having an active frequency component and is preferably generated and maintained, by an electronic circuit employing a saturable transformer having a feedback winding. The high frequency component is produced by "switching on" a transistor until the core of the transformer is magnetically saturated, as determined by the feedback winding or windings and the connected generator. The "switch on" initiates oscillation at the circuit resonance frequency and once initiated the energy from the core of the transformer maintains the reaction. In an alternate preferred embodiment, the current is a high voltage direct current having the active frequency component added thereto.

In the preferred embodiment, the generator acts as the capacitance in a parallel resonant circuit with the secondary winding of the transformer forming the inductor. The capacitive and inductive characteristics of the generator cell and inductor are chosen such that the circuit is essentially resistive at the resonant, active frequency. Energy transfer to the gas produces some heat and causes ozone production by interfering with and breaking the oxygen—oxygen bond.

Since the presence of gas alters the capacitance of the resonant circuit, the electronic circuit of the present invention is capable of compensating for changes in the reactor loading such as the gas flow rate, gas density, gas composition or gas temperature by sensing the changes in the dielectric constant of the gas. Any changes in the dielectric constant of the gas causes the current of the discharge in the generator to change, and hence the feedback winding changes the operating repetition rate to maintain the required active frequency for ozone production.

A flowing stream of gas can be fed to the generator such that a continuous process for ozone production is set up. To increase the output of ozone by the generator, the length of the generator element can be extended or a plurality of generator elements can be provided in series or parallel. In such arrangements, an electrical control can be provided to detect malfunction and cause the generator to be shut down.

BRIEF DESCRIPTION OF THE DRAWINGS

A further, detailed, description of the invention, briefly described above, will follow by reference to the following drawings of specific embodiments of the invention, which depict only typical embodiments of the invention and are therefore not to be considered limiting of its scope. In the drawings.

DETAILED DESCRIPTION OF THE INVENTION

Figure 1:
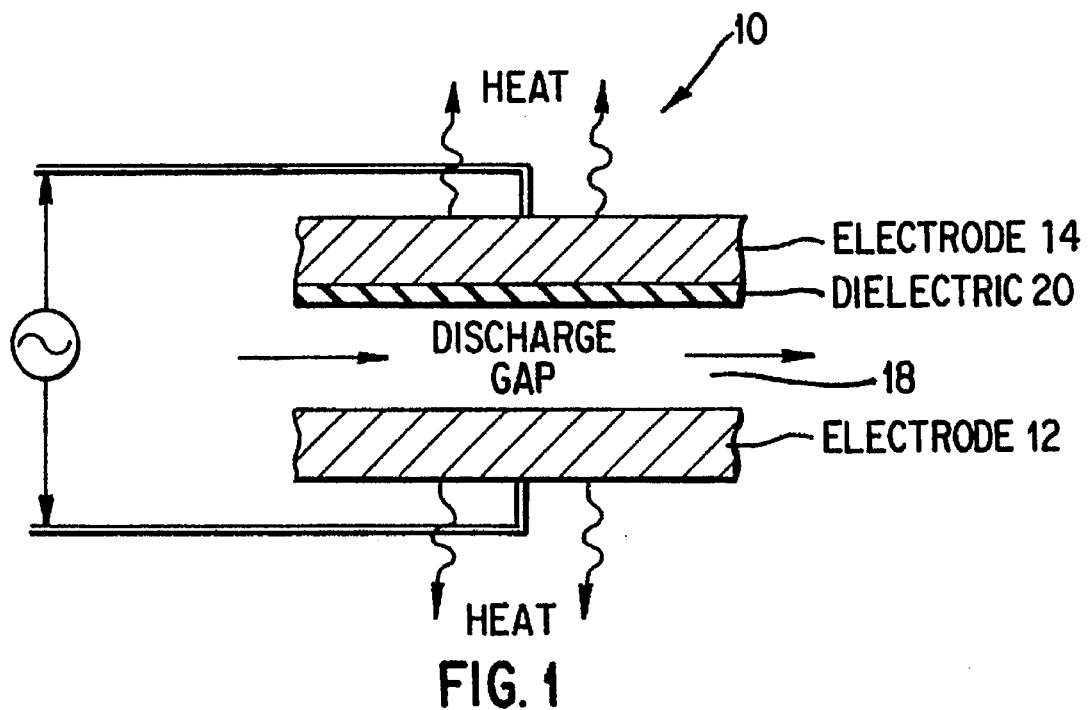
FIG. 1 shows a prior art ozone generator.
Figure 2:
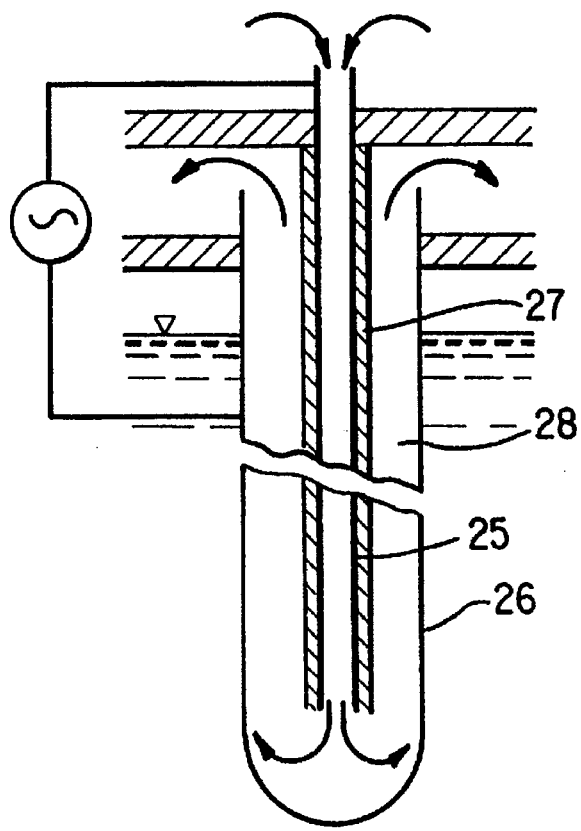
FIG. 2 shows another prior art ozone generator.
Figure 3:
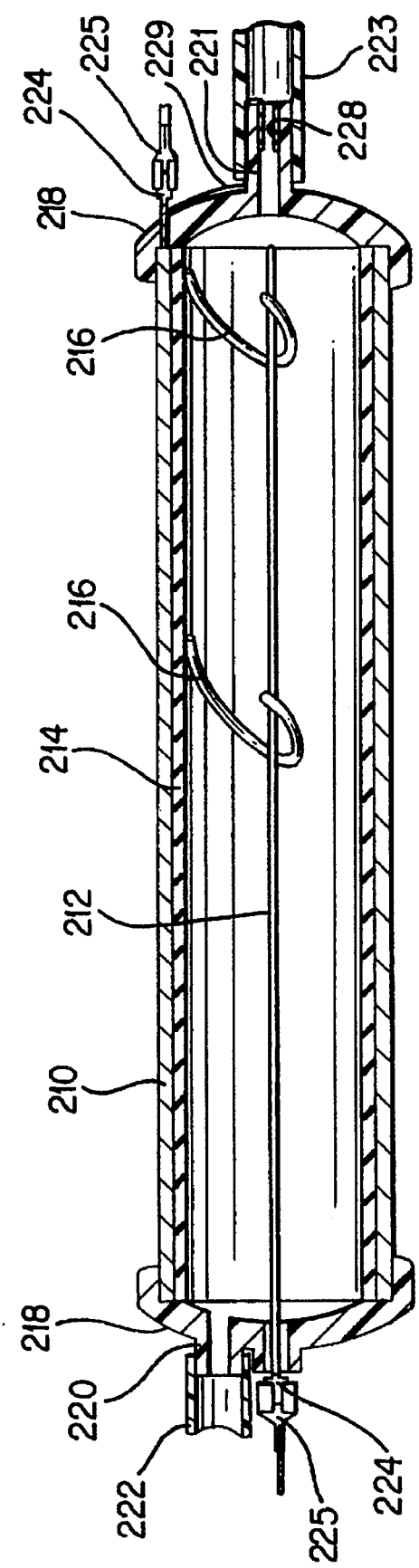
FIG. 3 shows a sectional view along the axis of an embodiment of a generator element according to the present invention.

Referring to FIG. 3, a perspective view of a generator element according to the present invention is shown comprising an outer ground electrode 210, an inner high voltage electrode 212 and a dielectric member 214 therebetween.

Ground electrode 210 is formed as a sleeve which is in telescopic arrangement with dielectric member 214 but as removable therefrom. High voltage electrode 212 is a straight length of metal such as stainless steel and is held concentrically within the dielectric member 214 by means of spiral centralizers 216 formed of plastic. End caps 218 are provided at the ends of the element to seal against the passage of gas out of the bore of the dielectric member 214. Ports 220, 221 are formed in end caps 218 for mounting gas supply and output lines 222, 223, respectively. Electrical connectors 224 are mounted on end caps 218 for connection to electrical lines 225.

Gas containing oxygen flows into the generator through port 220 and passes through the bore of dielectric member 214. Alternating current or pulsating direct current is applied between electrodes 210 and 212, by contact with an external power source through connectors 224 and lines 225, and through the gas causing ionization and modification of the molecular species present in the gas. Gas containing ozone moves out of the generator through the exit port 221. A conductive layer 228 is provided about the inner surface of exit port 221 which is in contact with ground electrode 210 via wire 229 and thereby provides for collection of current if water passes through it into contact with electrode 212.

When replacement or repair of the generator components is required, the generator is shut down, such as by stopping supply of gas and power and removing the supply lines. The end caps are removed and the defective parts are removed, including possibly the entire generator element. A new generator element can then be connected and the generation process re-initiated.

Figure 4:
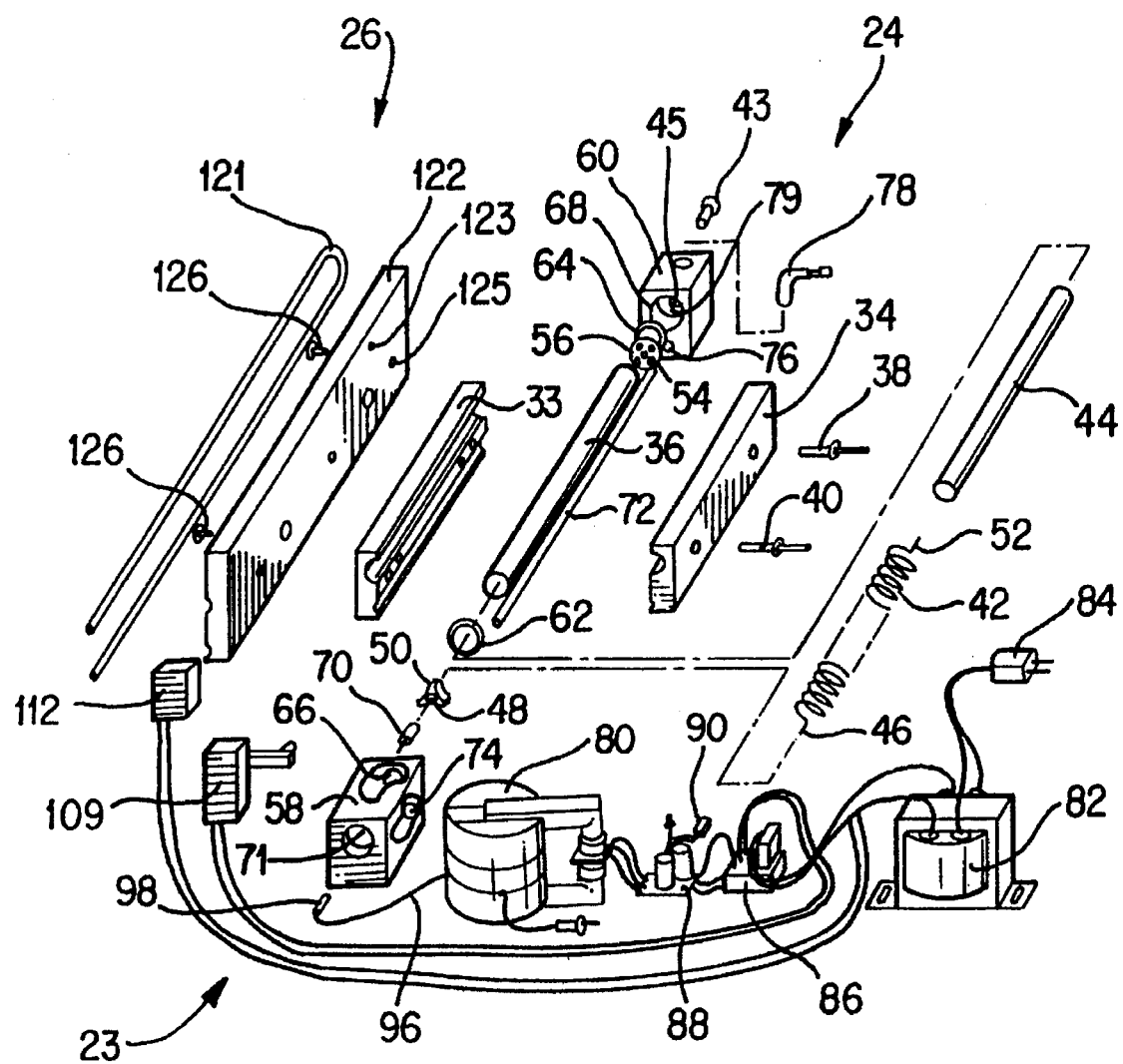
FIG. 4 shows an exploded, perspective view of another embodiment of a generator according to the present invention.

Referring to FIG. 4, a preferred generator for ozone production is shown. The generator comprises an apparatus 23 for producing a current comprising a waveform having an active frequency component, a reaction chamber 24 and a heat sink arrangement 26 associated with apparatus 23 and reaction chamber 24.

Reaction chamber 24 comprises ground electrodes 33 and 34 having corresponding grooves formed therein for accommodating and contacting dielectric tubular member 36. Electrodes 33, 34 are secured about member 36 by pop rivets 38 and 40.

Disposed within member 36 is high voltage spiral electrode 42 consisting of ozone inert metal such as stainless steel. The pitch and length of electrode 42 is selected to impedance match the impedance of apparatus 23. In addition, the length of electrode 42 is selected to prevent node reflection at the required discharge waveform. A screw 43 formed of a suitable dielectric material is inserted through a threaded aperture 45 in end ,block 60 to be in engagement with an end 52 of electrode 42 which allows external adjustment of the length and pitch of electrode 42. A dielectric member 44 acts as a filler and support for spiral electrode 42. An end portion 48 of spiral electrode 42 is inserted into central aperture 48 of centering triangle 50. The other end 52 of spiral electrode 42 is inserted into central aperture 54 of centering block 56. Tubular dielectric member 36 containing spiral electrode 42 and associated parts 44, 50, 56 is inserted between apertures 66, 68 of end blocks 58 and 60, formed of suitable dielectric material, respectively. Sealing means, such as O-rings 62, 64 are provided to seal the connection between tubular member 36 and the end blocks against passage of gas. Other sealing means can be used such as for example, silicone sealant. A high voltage pin 70 is inserted into aperture 48 of centering block 50 to be in electrical communication with end 46 of spiral electrode 42. The other end of pin 70 extends through, and is engaged within, an aperture 71 in end block 58 for electrical communication with apparatus 23.

A current collector 72 formed as a tubular member from corrosion resistant conductive metal is sealably secured such as by press fitting at its ends into apertures 74 and 76 of end blocks 58 and 60, respectively. Current collector 72 acts mechanically to join and form a gas conduit between end blocks 58 and 60. Electrodes 33 and 34 accommodate and make contact with current collector 72. Since electrodes 33 and 34 are at ground potential during operation and are in intimate contact with current collector 72, current collector 72 serves to prevent electrical current from passing out of the generator element during use.

Figure 5:
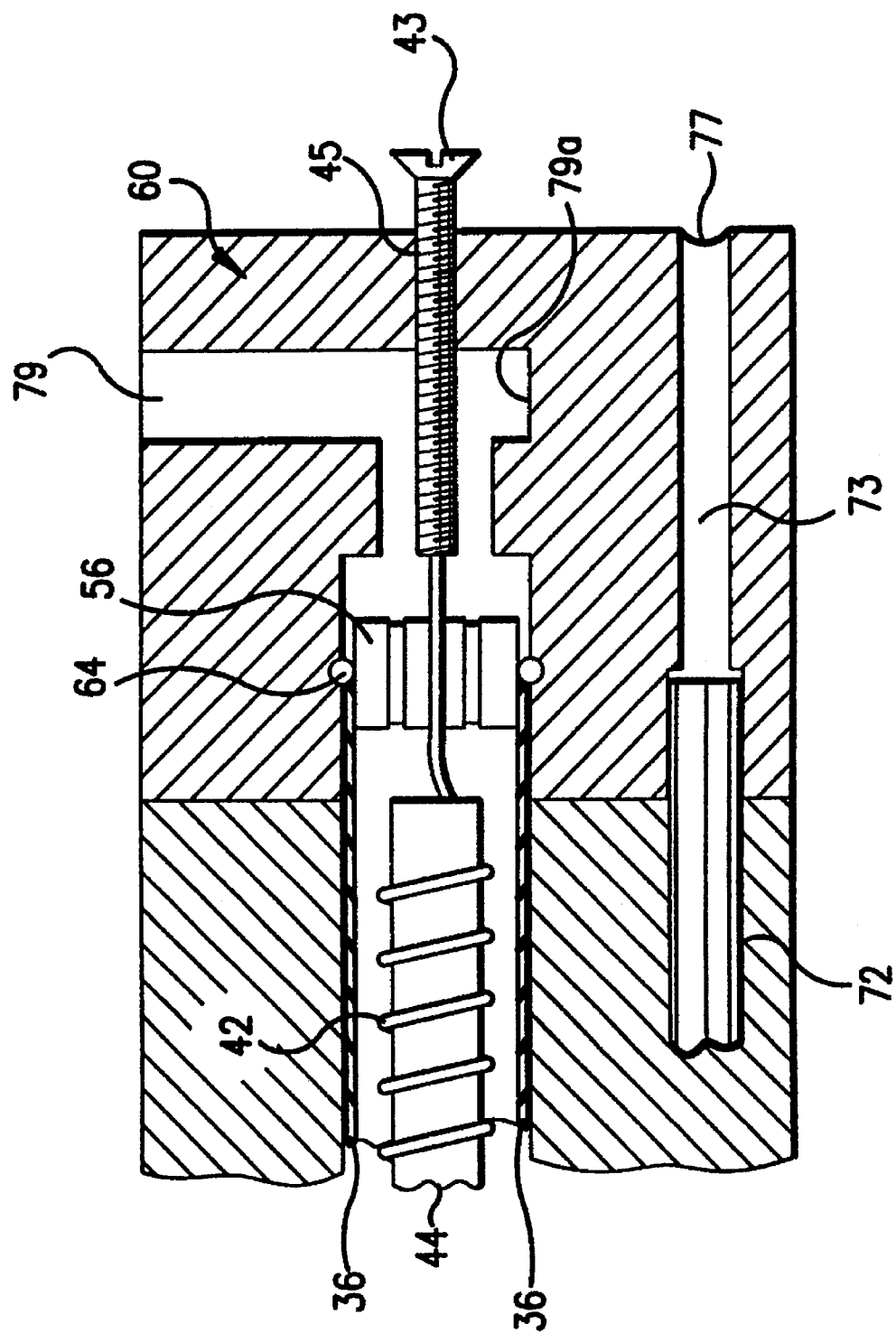
FIG. 5 shows a sectional view though an end block of an embodiment of a generator according to the present invention.

Referring to FIGS. 4 and 5, a stream of gas containing at least a portion of oxygen is provided to the generator through entry nozzle 78 into an upper chamber 79 of block 60. Upper chamber 79 of block 60 is formed generally as an "L" shaped chamber having an extending portion 79a which impedes insertion of articles, such as wires, into the generator to contact high voltage electrode 42. Still referring to FIG. 5, screw 43 is inserted into aperture 45 to be in contact with electrode 42. Electrode 42 is maintained in a recess formed in an end of screw 43 and is held therein by the resiliency in electrode 42. The length of electrode 42 can be altered by changing the extent to which screw 43 is inserted into end block 60.

The gas is directed into and passes through dielectric tubular member 36 and about spiral electrode 42 into end block 58. Dielectric member 44 acts within dielectric member 36 to direct the gas into close association with spiral electrode 42. The spiral configuration, in addition to providing impedance in the generator, acts to create turbulence in the passing gas stream and thereby enhance mixing. Such mixing allows for increased heat transfer from electrode 42 to electrodes 33 and 34 which are cooled by heat sink 26. Gas returns along the bore of current collector 72 to enter a lower chamber 73 of block 60 where an outlet 77 is provided from the generator. Gas passing through this system is reacted when passing through dielectric tubular member 38 preferably by application of a selected active frequency current applied through electrode 42. Current is provided to electrode 42 by apparatus 23.

Apparatus 23 for producing current is of any suitable kind. In a preferred embodiment, apparatus 23 is comprised of a circuit, as will be described in reference to FIG. 9, including among its components a high voltage transformer 80, a low voltage transformer 82, a bridge rectifier 86, a switch 109, transistor 90 and associated electronics 88. The low voltage transformer 82 is provided with fluctuating power such as alternating current by means of plug 84. The current produced by apparatus 23 is communicated to the generator through a high voltage wire 96 having a plug socket 98 on an end thereof for making contact with high voltage pin 70 in end block 58. Switch 109 interrupts the power flowing from the transformer 82 to the electronics 88 when end block 58 is moved away from plug 98. Thermal switch 112 on heat sink 26 interrupts power flowing from transformer 82 when the temperature in the generator exceeds a predetermined level.

When the high frequency, high voltage current is applied to the gas in the generator, heat is generated. A heat sink 26 is provided in association with reaction chamber 24 to reduce temperature fluctuations in the generator. Heat sink 26 comprises a thermally conductive tube 121 which is inserted into a heat sink block 122. A suitable coolant is circulated through tube 121. Holes in the heat sink block 122 include a threaded hole 123 to mount the transistor 90 and a threaded hole 125 to mount the bridge rectifier 86. Heat sink block 122 is firmly mounted to ground electrodes 33 and 34 through conductive screws 126 which also act to ground electrodes 33 and 34. Screws 126 are easily removable to allow removal of generator element.

Figure 6:
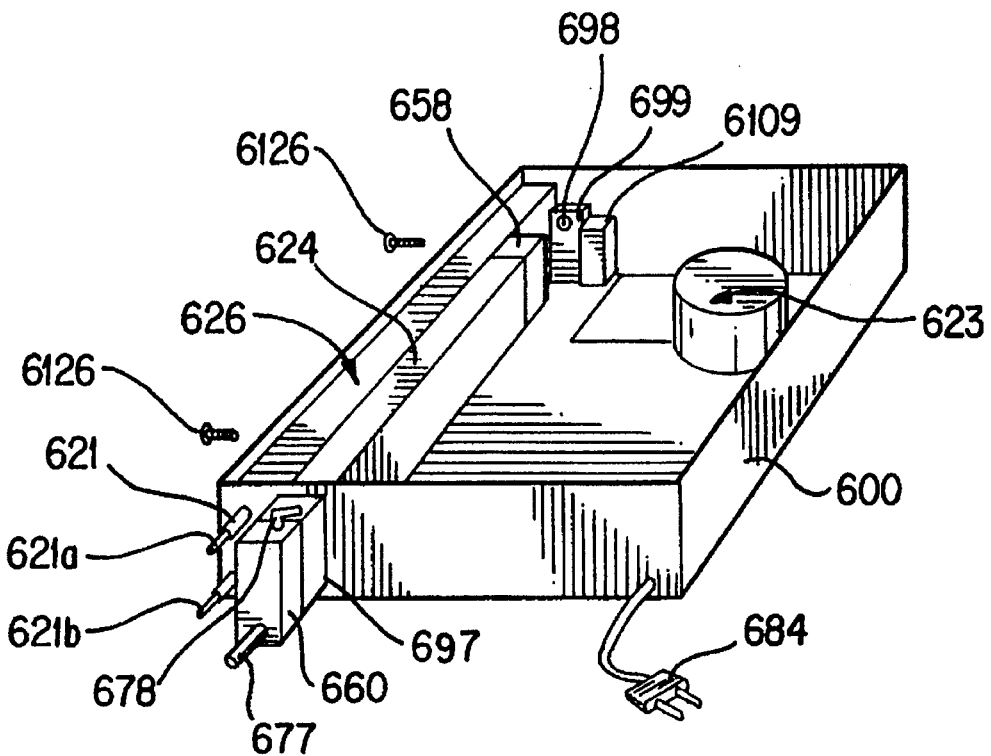
FIG. 6 shows a perspective view of a modular generator according to the present invention with a panel of the housing removed to show the inner components.

Referring to FIG. 6, in the preferred embodiment, the generator is provided in the form of a module to facilitate installation. The module comprises a housing 600 (shown with the top removed) formed of durable material such as thermoplastic. Housing 600 provides encasement for an apparatus 623 for producing current, a generator element 624 and a heat sink arrangement 626. Extending from housing 600, for connection to external supply lines, are plug 684 and ends 621a and 621b of thermally conductive tube 621. Additionally, end block 660 of generator element 624 extends from housing 600 to allow connection of gas lines to entry nozzle 678 and outlet 677. Generator element 624 is removably installed within housing 600 by insertion through aperture 697 and into abutment with upstanding stop 699 (generator element 624 is shown partially inserted in FIG. 6). Stop 699, formed of a suitable dielectric, supports high voltage plug socket 698 which is aligned for contact with a high voltage pin extending through an aperture of end block 658. When in place screws 6126 are inserted through a side wall of housing 600 to engage heat sink 626 and the ground electrodes of generator element 624. A pressure sensitive switch 6109, disposed adjacent stop 699, interrupts the power to apparatus 623, when generator element 624 is not fully inserted into housing 600 such that the high voltage pin is not inserted into socket 698. Such a generator element installation arrangement allows for removal and replacement of chambers, when desired, without affecting the circuitry or heat sink components.

Figure 7:
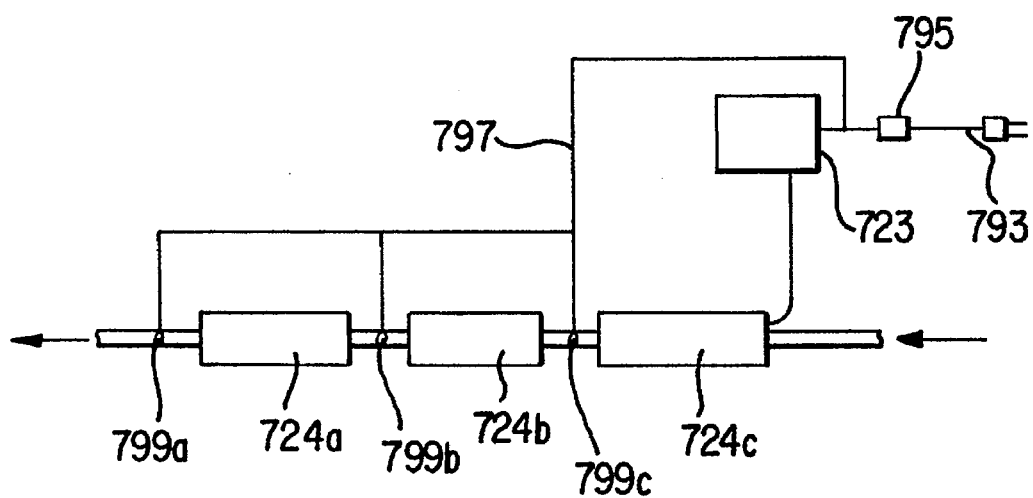
FIG. 7 shows a schematic diagram of a generator system according to the present invention.

As shown schematically in FIG. 7, the output of ozone by the present ozone generator can be increased by providing a generator system comprising a plurality of generator elements 724a, 724b and 724c in series. Problems in scale-up, such as reconfiguration of enlarged generators, are thus avoided by installing optimized generators in greater numbers. To control the passage of untreated gas through the system, in case of system failure, valves 799a, 799b and 799c are provided at the outlet of each generator element so that gas can flow from element 724c through element 724b and then through element 724a. These valves are held open in normal operation by power supplied via line 797, which is in series with the apparatus 723 for producing current. Where the system fails, such as by dielectric breakdown, a current-sensitive protective device 795, such as a fuse or circuit breaker, in the power supply 793 senses the increase in current and stops power to the system. Valves 799a, 799b, and 799c then stop the flow of gas through the chambers 724a, 724b and 724c until the flow of current is resumed, thereby preventing output of any unreacted gas through the system.

Figure 8:
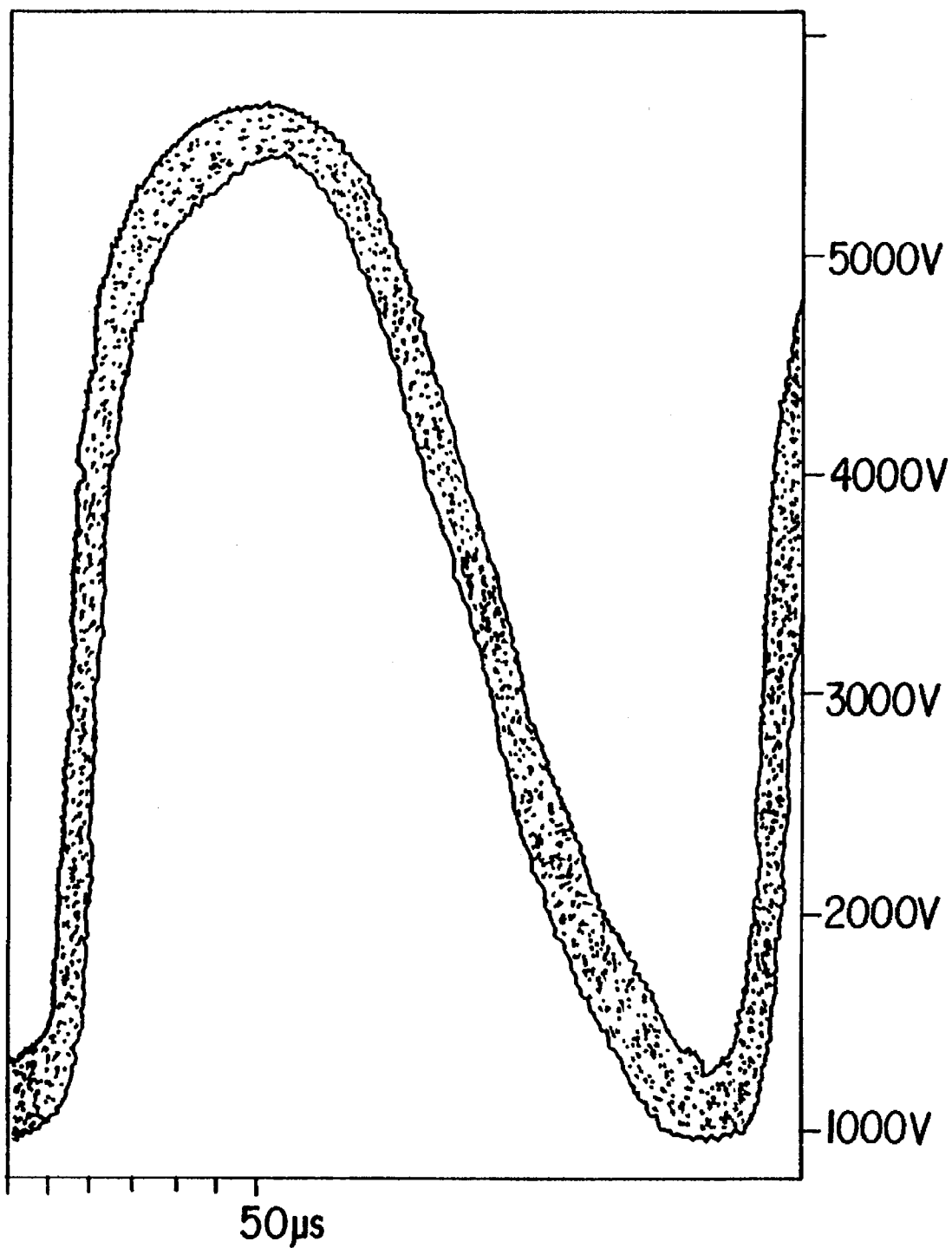
FIG. 8 shows an oscilloscope representation of a waveform useful in the present invention.

Referring to FIG. 8, a waveform is shown which is useful in the selective breaking of oxygen—oxygen bonds in oxygen molecules to produce ozone. The active portion of the waveform is shown between A and B. From the oscilloscope, calculations of the slope of the substantially straight rise portion of the leading edge between A and B indicate that the rate of voltage increase over this portion is in the order of $6.6 \times 10^6$ volts/second. Such an active portion is believed to correspond to a frequency in the order of 10 to 100 megaHz. The waveform is applied at a repetition rate of about 6.67 kHz to air at a temperature of 26° C. and atmospheric pressure to produce ozone. Ozone generation is enhanced by applying the waveform to air at lower temperatures. The generator of use with the waveform having parameters as shown is generally as shown in FIG. 4 and is 4 to 8 inches in length having a corresponding length high voltage electrode having 22 turns and formed from 0.036 inch stainless steel wire.

Figure 9:
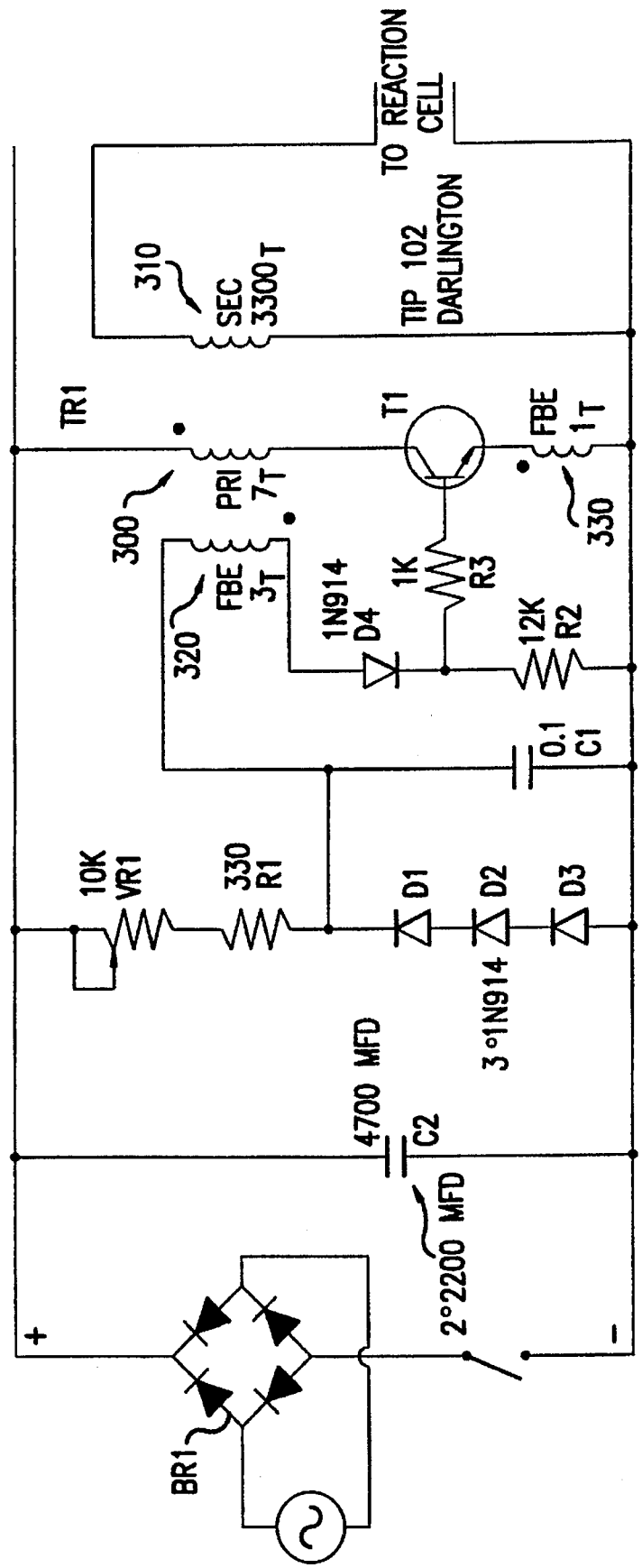
FIG. 9 shows a circuit diagram of an electronic circuit useful in the present invention; and, FIGS. 10A and 10B show oscilloscope representations of a waveforms useful in the present invention.

Referring to FIG. 9, a preferred embodiment of a circuit is shown for use in generating current comprising a waveform as shown in FIG. 8. The circuit comprises a Darlington pair transistor T1 and a ferrite core transformer TR1. The transformer TR1 has four windings, the primary winding 300, a secondary (output) winding 310, and two feedback windings 320 and 330. The primary winding 300 connects the collector of the transistor T1 to the positive power supply voltage. The secondary winding 310 is the output of the generator circuit and is applied to one of the electrodes of the reactor cell shown in FIG. 3. The feedback winding 320 is connected via diode D4 and R3 to the base of the transistor T1. The other terminal of the feedback winding 320 is connected to the biasing circuit of the transistor T1, which comprises variable resistor VR1, resistor R1 and resistor R2, as well as silicon switching diodes D1, D2 and D3. The feedback winding 330 connects the emitter of the transistor T1 to the negative terminal of the power supply. The circuit operates as follows.

Transistor T1 is present to permit the generation of a fast rise waveform. In a circuit which is intended to produce pulsed DC waveforms, one transistor T1 is used. If it is desired to produce AC waveforms, a second transistor (not shown) is used. As the transistor T1 is handing a high peak current, a heat sink to dissipate the heat generated by such current should be used.

Transformer TR1 is a saturable transformer having a ferrite core material with very low losses. In a preferred embodiment, TR1 has a ferrite core comprising a 7 turn primary winding 300, a 3 turn feedback winding 320, a 1 turn feedback winding 330 and a secondary winding 310 having 3300 turns of 22 gage wire.

The diodes D1, D2,. D3, and D4 are silicon switching diodes that are selected to have voltage and temperature characteristics which correspond the Darlington transistor. Diodes D1, D2, and D3 give a regulated "switch on" voltage for transistor T1. Diode D4 acts to prevent the negative feedback voltage turning the base-emitter junction of transistor T1 back "on" by reverse voltage avalanche breakdown. Any similar silicon switching diode to IN914 can be used for diodes D1, D2, D3, and D4.

Variable resistor VR1 and fixed resistor R1 regulate the current to maintain the voltage across the diodes and bias the base of the transistor T1. Variable resistor VR1 is used to set the operating current, compensating for different gain of transistors, Resistor R1 acts to limit the current when variable resistor VR1 is set to 0. Alternatively, a faced value resistor of suitable resistance for the transistor used, can replace both R1 and VR1.

Feedback winding 330 is connected to the emitter of the transistor. It provides compensation for change of gain versus temperature, and provides some compensation for transistors of different gain. Winding 330 is most useful in high power reactors, However, since it also acts to damp harmonics in the system, which would interfere with the desired active frequency, it is preferably included in all circuits.

Capacitor C1 reduces variations in the supply voltage reaching the base of transistor T1 during normal operation.

This is important in high current generators. Due to the high switching current, smoothing capacitors C1 and C2 must each handle high peak ripple currents and must be rated accordingly.

Power is applied to the circuit by an AC source, as shown. The current within the circuit is preferably 12 volt DC. Therefore where 120 volt power is used a step down transformer is required prior to the bridge rectifier BR1. The bridge rectifier is useful even where the power supply is a battery, since the rectification allows connection of the battery without concern as to matching terminals.

After power is applied to the circuit, the base of transistor T1 is driven positive and the collector current increases. For the purposes of this description, it is assumed that the circuit has been operating for some time and that we are starting the description from the point where the base of transistor T1 is being driven positive and the collector current is increasing.

With translator T1 fully switched on, the current through the primary winding of TR1 transformer increases at a rate set by the transformer inductance and the generator capacitance. As the current increases, the transformer core magnetizes, and a voltage is induced into the base feedback winding 320. The negative going end of feedback winding 320 is connected to the voltage reference diodes D1, D2, D3 and the positive going end connected through diode D4 to resistor R2 and the base of transistor T1. Thus, an induced voltage in feedback winding 320 acts to maintain transistor T1 "on". The actual drive current is set by the value of the resistors VR1 end R1.

Resistor R3 together with the base input capacitance of transistor T1 reduces current oscillation at very high frequency during switching. Preferably, resistor R3 is connected directly at the base of transistor T1.

As the transformer core approaches saturation, the rate of current increase drops. As it drops, the induced voltage in the base feedback winding reduces thus reducing the drive to the transistor, which then staffs to turn off. This reduces the rate of increase of the collector current through primary winding 300 and this in turn further and further reduces the feedback voltage. This very rapidly turns the transistor fully off. As the core magnetic field is no longer being maintained by the transistor, the magnetic field collapses reversing the voltage in the base feedback winding 320 and placing a negative voltage on the anode of diode D4 turning it off thus keeping transistor T1 turned off. This also effectively unloads the feedback winding 320 and prevents any damping of the now oscillating secondary winding 310.

As the current drops towards zero across the base of feedback winding 320, the generated negative voltage across the base feedback winding 320 decreases until it no longer cancels the bias voltage at the cathode of diode D1. When this happens, the transistor starts to turn on. As it does, the current starts increasing and this in turn reverses the voltage in the base feedback winding 320. This applies additional positive voltage to the base of transistor T1 turning it fully on and into full saturation. Now the transistor is turned fully on and the collector current increases, which is where the cycle repeats.

The invention will be further illustrated by the following examples. While the examples illustrate the invention, they are not intended to limit its scope.

EXAMPLE 1

Air at atmospheric pressure and 26° C. was dehumidified such that it had a dew point between 35° and 40° F. The air was introduced to a ozone generator, generally as described in reference to FIG. 4, at a flow rate of 3 l/min. Air exiting the generator was passed to an ozone monitor for analysis.

Electrical discharges were applied to the air as follows:

1. A sinusoidal waveform having a frequency of 60 Hz and varied between 5,000 and 8,000 volts;
2. A sinusoidal waveform having a frequency of 6.5 kHz and ranging between 5,000 and 8,000 volts;
3. A square waveform having a frequency of 6.5 kHz and ranging between 5,000 and 8,000 volts; or,
4. A waveform according to FIG. 8 at a repetition rate of 6.67 kHz and an amplitude of 4,500 volts.

Typical ozone production results by use of waveforms 1 to 4 for treatment of air are summarized in Table 1.

TABLE 1

| Waveform | Ozone concentration (% by weight) |
| --- | --- |
| 1 | 0.001 |
| 2 | 0.066 |
| 3 | 0.066 |
| 4 | 0.332 |

Conversion rates were increased by use of the fast rise waveform according to the present inventive process.

EXAMPLE 2

Air at atmospheric pressure and 22° C. and having a relative humidity of 80% was introduced at a flow rate of 3.8 l/min to ozone generators, generally as described in reference to FIG. 4 without the use of a heat sink and having the parameters as set out in Table 2.

TABLE 2

|  | Ozone generator A | Ozone generator B |
| --- | --- | --- |
| Length | 12 inch | 4 inch |
| Capacitance (at frequency = 0) | 147 pF | 34 pF |
| Resonance | 58.2 Mhz | 66.0 Mhz |
| Inductance | 0.0508 uH | 0.170 uH |

The measurements for the generators were carried out in 18° C., atmospheric pressure and 70% RH using a MIC37 multimeter and a MFJ HF/VHF SWR analyzer, to measure capacitance and resonance, respectively. Inductance was calculated.

The waveform was monitored using a Phillips PM3365A 100 MHz Oscilloscope set at 5 VDC and 0.1 ms connected to a Techtronix P6015 1000× probe. Air exiting the generator was passed to an ozone monitor for analysis.

Figure 10A:
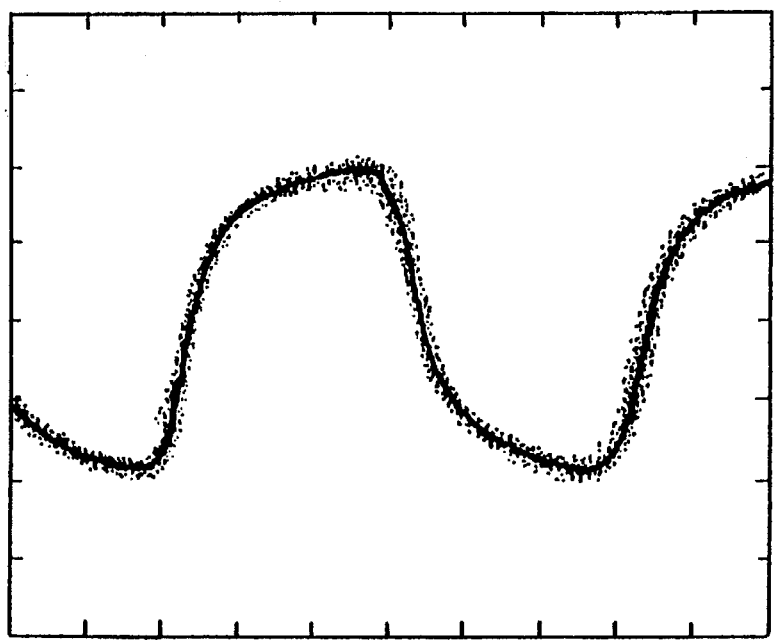
Figure 10B:
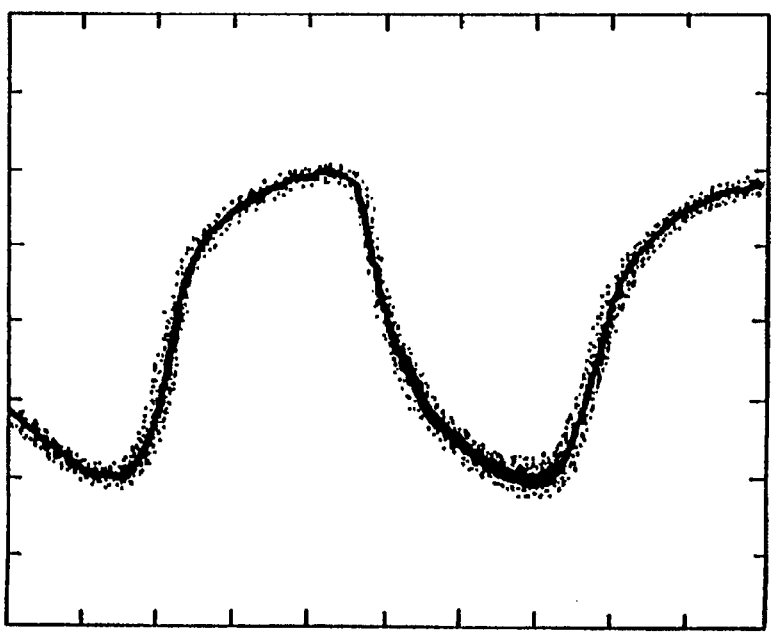

The waveforms which were found to produce optimum amounts of ozone for generator A and generator B are shown in FIGS. 10A and 10B, respectively. The waveform parameters and ozone production results are shown in Table 3.

TABLE 3

|  | Ozone generator A | Ozone generator B |
| --- | --- | --- |
| Repetition rate (Hz) | 1603 | 1637 |
| Voltage (kV) | 20 | 22 |
| Leading edge rate of voltage increase (V/s)* | 234 × 10$^6$ | 233.5 × 10$^6$ |
| Ozone concentration (% by weight) | 0.190 | 0.145 |

*determined from oscilloscope

The active frequency for ozone production is uniform for gas having the same composition, flow rate, temperature and pressure regardless of the reactor parameters. The active frequency can be determined for each reactor by adjusting the amplitude and repetition rate.

EXAMPLE 3

Air at atmospheric pressure and 22° C. and having a relative humidity of 80% was introduced at a flow rate of 3.8 l/min to ozone generator A as described in Example 2. The waveform was monitored using a Phillips PM3365A 100 MHz Oscilloscope set at 5 VDC and 0.1 ms connected to a Techtronix P6015 1000× probe. Air exiting the generator was passed to an ozone monitor for analysis.

The waveform was changed from waveform 1, having a slower rate of voltage increase than the waveform of FIG. 10A, to waveform 2, according to FIG. 10A, by adjusting the power to the generator. Results are shown in Table 4.

TABLE 4

| Waveform | Ozone Concentration (% by weight) |
|---|---|
| 1 | 0.021 |
| 2 | 0.190 |

It will be apparent that many other changes may be made to the illustrative embodiments, while falling within the scope of the invention and it is intended that all such changes be covered by the claims appended hereto.

We claim:

1. An apparatus for producing ozone from oxygen comprising a generator element having a high voltage electrode, a ground electrode separated from the high voltage electrode to form a gap therebetween, and a dielectric element occupying a portion of the gap, the generator element being electrically connected to a circuit for producing an alternating current or pulsed direct current by means of a releasable connector, said high voltage electrode extending into a spacer, and said releasable connector connecting the high voltage electrode through said spacer to said circuit.

2. The apparatus of claim 1 wherein the releasable connector is a high voltage plug connected to high voltage electrode and registering with a high voltage socket in communication with the circuit.

3. The apparatus of claim 1 wherein the plug is a pin, having one end extending through the end cap to make contact with the high voltage electrode and a socket in communication with the circuit.

4. The apparatus of claim 1 wherein a housing is disposed about the generator element and circuit, and the generator element is removable from the housing.

5. The apparatus of claim 1 wherein a heat sink is disposed in contact with the generator element.

6. The apparatus of claim 1 further comprising a switch for interrupting power to the circuit when the generator element is removed from the circuit.

7. The apparatus of claim 1 wherein the dielectric member is a tubular member, accommodated within and in contact with the ground electrode and the high voltage electrode is disposed within the dielectric member.

8. The apparatus of claim 7 wherein the generator element further comprises an end cap at each end thereof.

9. The apparatus of claim 8 wherein each end cap is formed as a block having a chamber for passage of gas therethrough, each said block having an aperture for insertion of the dielectric member therein such that a continuous passage is formed between the end blocks.

10. The apparatus of claim 7 further comprising a grounded current collector at an outlet from the generator element.

11. The apparatus of claim 10 wherein the current collector is a conductive gas conduit and is accommodated within the ground electrode.

12. The apparatus of claim 9 further comprising a grounded current collector at an outlet from the generator element.

13. The apparatus of claim 12 wherein the current collector is formed as a conductive gas conduit, having its ends inserted into the end caps and is accommodated within the ground electrode.

14. The apparatus of claim 1 wherein the high voltage electrode is a spiral electrode having a selected pitch and length, further comprising a dielectric member disposed within the spiral electrode, and further comprising a means for adjusting the pitch and length of the spiral electrode.

15. The apparatus of claim 14 wherein the means for adjusting the pitch and length of the spiral electrode is a dielectric screw in contact with the spiral electrode.

16. An apparatus for producing ozone from oxygen comprising a generator element having a high voltage electrode, a ground electrode separated from the high voltage electrode to form a gap therebetween, end a dielectric element occupying a portion of the gap, the high voltage electrode being electrically connected to a circuit for producing alternating or pulsating direct current, and a grounded current collector at an outlet to the generator element.

17. The apparatus as defined in claim 16 wherein the current collector is conductive tubular member for passage of gas therethrough and in electrical contact with the ground electrode.

18. The apparatus as defined in claim 17 wherein the tubular member is accommodated within the ground electrode.

19. The apparatus as defined in claim 16 further comprising a first end cap at a first end of the generator element and a second end cap at an opposite end of the generator element and the tubular member engaged between the first end cap and the second end cap.

20. An apparatus for producing ozone from oxygen comprising a generator element comprising a reaction chamber having a high voltage electrode, a ground electrode separated from the high voltage electrode to form a gap therebetween, and a dielectric element occupying a portion of the gap, the high voltage electrode being electrically connected to a circuit for producing alternating current or pulsating direct current, the reaction chamber being provided such that its inductance and capacitance are selected to produce a waveform within the gap having an active high frequency component which is selected to break apart the oxygen, further comprising means capable of optimizing the waveform by adjusting its leading edge slope while analyzing the apparatus output for ozone, and setting the leading edge at a slope which yields a highest percent output of ozone.

21. The apparatus of claim 20 wherein the high frequency component is a primary or harmonic of the natural oscillating frequency of the oxygen molecule's oxygen—oxygen bond.

22. The apparatus of claim 20 wherein the waveform is produced on high voltage direct current.

23. The apparatus as defined in claim 20 wherein the high voltage electrode and the ground electrode have a geometry selected to be impedance matched to the circuit.

24. The apparatus as defined in claim 20 wherein the high voltage electrode has a length selected to prevent node reflection.

25. An apparatus for producing ozone from oxygen comprising a generator element having a high voltage electrode, a ground electrode separated from the high voltage electrode to form a gap therebetween, and a dielectric element occupying a portion of the gap, the high voltage electrode being electrically connected to a circuit for producing alternating or pulsating direct current, the circuit having a saturable transformer with at least one feedback winding.

26. The apparatus of claim 25 wherein the circuit comprises a second feedback winding in the emitter of the transistor.

27. A ozone generator system comprising: a plurality of generator elements, each generator element having a high voltage electrode, a ground electrode separated from the high-voltage electrode to form a gap therebetween and a dielectric element occupying a portion of the gap; and, a circuit for producing alternating or pulsating direct current electrically connected to the high voltage electrode of each generator element, further comprising a valve at the outlet of each generator, each valve being an electrical valve and in series with the circuit; and, a current-sensitive protection device in communication with the circuit and valves for interrupting the current to the circuit and the valves when the current exceeds a predetermined value.

28. An apparatus for producing ozone from oxygen comprising a generator element having a high voltage electrode, a ground electrode separated from the high voltage electrode to form a gap therebetween, and a dielectric element occupying a portion of the gap, the generator element being electrically connected to a circuit for producing an alternating current or pulsed direct current by means of a releasable connector, and a grounded current collector at an outlet from the generator element, wherein the dielectric member is a tubular member, accommodated within and in contact with the ground electrode, and the high voltage electrode is disposed within the dielectric member.

29. The apparatus of claim 28 wherein the current collector is a conductive gas conduit and is accommodated within the ground electrode.

30. An apparatus for producing ozone from oxygen comprising a generator element having a high voltage electrode, a ground electrode separated from the high voltage electrode to form a gap therebetween, and a dielectric element occupying a portion of the gap, the generator element being electrically connected to a circuit for producing an alternating current or pulsed direct current by means of a releasable connector, wherein the dielectric member is a tubular member, accommodated within and in contact with the ground electrode and the high voltage electrode is disposed within the dielectric member, the generator element further comprises an end cap at each end thereof, each end cap is formed as a block having a chamber for passage of gas therethrough, each said block having an aperture for insertion of the dielectric member therein such that a continuous passage is formed between the end blocks, and further comprising a grounded current collector at an outlet from the generator element.

31. The apparatus of claim 30 wherein the current collector is formed as a conductive gas conduit, having its ends inserted into the end caps and is accommodated within the ground electrode.

32. An apparatus for producing ozone from oxygen comprising a generator element having a high voltage electrode, a ground electrode separated from the high voltage electrode to form a gap therebetween, and a dielectric element occupying a portion of the gap, the high voltage electrode being electrically connected to a circuit for producing alternating or pulsating direct current, the high voltage and ground electrodes having a geometry selected to be impedance matched to the circuit, wherein the high voltage electrode is a spiral electrode having a selected pitch and length, further comprising a dielectric member disposed within the spiral electrode, and means for adjusting the pitch and length of the spiral electrode.

33. The apparatus of claim 32 wherein the means for adjusting the pitch and length of the spiral electrode is a dielectric screw in contact with the spiral electrode.

34. An ozone generator system comprising: a plurality of generator elements, each generator element having a high voltage electrode, a ground electrode separated from the high voltage electrode to form a gap therebetween and a dielectric element occupying a portion of the gap; and, a circuit for producing alternating or pulsating direct current electrically connected to the high voltage electrode of each generator element; and, a valve at the outlet of each generator, each valve being an electrical valve and in series with the circuit; and, a current-sensitive protection device in communication with the circuit and valves for interrupting the current to the circuit and the valves when the current exceeds a predetermined value.

* * * * *